Patented Jan. 21, 1930

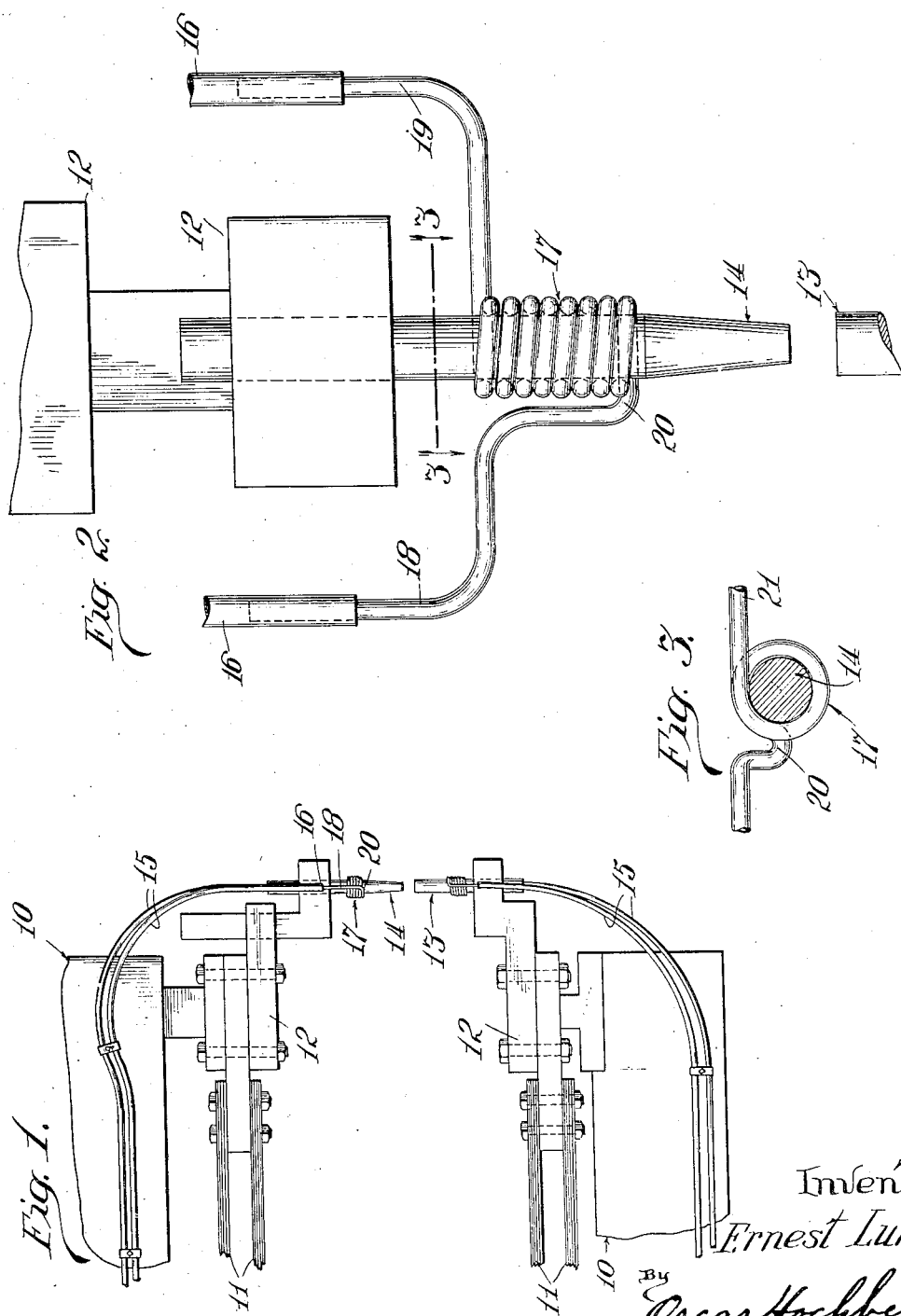

1,744,399

UNITED STATES PATENT OFFICE

ERNEST LUNN, OF CHICAGO, ILLINOIS, ASSIGNOR TO PULLMAN CAR AND MANUFACTURING CORPORATION, OF CHICAGO, ILLINOIS, A CORPORATION OF ILLINOIS

ELECTRODE-COOLING COIL

Application filed September 10, 1927. Serial No. 218,764.

The invention relates to means for cooling the tips of electrodes of the type used in electric spot-welding machines.

The principal object of the invention is to prevent the overheating of electrodes used in spot-welding operations by the use of a cooling medium circulating in coils mounted upon the electrodes.

An important object is to employ such means in the form of tubing coiled about the electrode to be cooled.

A particular object is to provide a coil of tubing that can be attached to the electrodes of a welding machine without the use of extraneous fastening devices and applied and removed without tools.

I attain the foregoing and other objects by the mechanism illustrated in the drawings in which:

Fig. 1 is a side elevational view of an electric welding machine showing upper and lower electrodes equipped with electrode cooling mechanism of my invention;

Fig. 2 is a front elevational view of the upper electrode with attached cooling mechanism drawn to an enlarged scale; and Fig. 3 is a transverse section thru the upper electrode taken on line 3—3 of Fig. 2 showing the cooling coil operatively attached.

Heretofore, considerable difficulty has been caused by the overheating of electrodes used in spot welding operations. Such overheating resulted usually in the burning out of the work or premature deterioration of the electrodes when exposed to the air at high temperatures, especially when the electrodes were tipped with refractory metals like tungsten or molybdenum for pressure contacts.

In the practice of my invention the difficulties incident to the overheating of the welding electrodes are avoided by circulating a cooling medium about the electrodes to maintain them at a welding temperature suitable to the particular operation involved.

In the drawings, 10 represents the electrode jaws of an electric spot welding machine of an approved type. Upon the jaws are mounted the laminated electric conductors 11 secured to the solid conductors 12 for supporting fixed lower electrode 13 and adjustable upper electrode 14 as best shown in Fig. 1. Supported preferably upon the upper and lower jaws 10 are pipes 15 leading to a source of water supply and connecting with short flexible hose pieces 16 communicating with the cooling coils 17, hereinafter described, secured to upper and lower electrodes 14 and 13, respectively.

The coils 17 are self clamping upon the electrodes. For this purpose they embody the use of resilient metallic tubing, preferably of hard drawn copper, formed upon a mandrel of smaller diameter than that of the electrodes so that by applying a slight opening or unwinding pressure to the tubing the inside diameter of the coils may be increased sufficiently to receive the respective electrodes. Upon release of the opening pressure upon the tubing the retractile action of the coils will cause them to clutch their respective electrodes with sufficient pressure to insure positive contact between them thruout the length of the coils, as indicated in Fig. 3 of the drawings.

To facilitate manipulation of the coils and to provide suitable fluid connection with tubing 16 leading to the circulating water system, the coils 17 are each formed with terminal liquid inlet and outlet portions 18 and 19, respectively, disposed preferably as shown in Fig. 2 illustrating the application of the coil to upper electrode 14. In the embodiment shown, the terminals 18 and 19 are entered in flexible tubing 16 and there held by the tubing itself or otherwise, as desired, the tubing flexing under the movements of the cooling coil upon the electrode or during the adjustment of the electrode and holder.

It will be noted that the terminal coil portions 18 and 19 are similarly directed and in such relation that they may be grasped by the hand of the operator and caused to approach each other, whereupon the inside diameter of the coil will expand to release the grip of coil tubing upon the electrode to permit instant adjustment or removal of the cooling coil. To prevent abnormal expansion and possible distortion of the coil under excessive pressure, the coil may be fitted with a split sleeve or the like to limit the spread of the coil to a degree only to permit sufficient expansion to effect disengagement of the coil from the electrode. The sleeve may rest with its lower peripheral edge upon the laterally offset portion 20 of the base terminal 18 of the coil with the upper edge of such sleeve beneath the offset portion 21 of the opposite and upper terminal 19, as will be understood. The coils are readily and economically produced by any operator supplied with the proper materials and a winding mandrel and may be applied to any standard electrode.

Experience has shown that because of the intimate contact of coil and electrodes, resulting from the winding of the coil tubing about a rod or mandrel to produce a coil having an initial inside diameter substantially smaller than the electrode, the electrodes are more effectively cooled by the liquid circulating thru the coils than by any other known method heretofore employed. The useful life of electrodes thus cooled has been substantially increased, with a corresponding rise in the output of machines equipped with the coils and a marked decline in the quantity of materials spoiled by overheating.

In operation, assuming the upper one of the electrodes of a welding machine to be fitted with the coil above described, and a suitable circulating water supply or other cooling medium, being available and connected with the machine thus equipped, the base terminal 18 of the coil is connected with the supply pipe of the water system and the upper terminal 19 of the coil to the outlet pipe of the system, whereby the electrode cooling water first enters the coil at the base terminal and nearest the working tip of the electrode and passes upwardly thru the coil and about the electrode and is expelled at the upper terminal 19. As the fluid passes thru the coil it absorbs and carries off the heat radiated by the electrode, effectively checking the destructive action of excessively high temperatures produced by the welding current. Obviously, and in the case of the lower electrode coil, the cooling medium will enter the coil at the terminal nearest the tip of the lower electrode and be expelled from the opposite terminal and thru the outlet pipe of the circulating system.

What I claim is:—

1. The combination with an electrode of an electric welding machine, of a metallic cooling coil expanded to receive said electrode, and coil expanding means integral with said coil.

2. The combination with the electrode of an electric welding machine, of a metallic cooling coil concentric with and in gripping relation to said electrode, said coil having a normal inside diameter relatively smaller than the electrode, and means for expanding said coil.

3. The combination comprising an electrode, a metallic cooling coil in gripping relation thereto, and means for expanding the coil.

4. The combination comprising an electrode, a metallic cooling coil in gripping relation thereto, and means adapted to be flexed toward the electrodes to expand said coil.

5. In a welding machine, the combination comprising a metallic cooling coil having spaced terminal portions communicating with a fluid circulating system and adapted to be flexed toward each other to expand the coil, and an electrode mounted between said terminal portions in gripping relation to said coil.

In witness whereof I have hereto set my hand this 20th day of August, 1927.

ERNEST LUNN.